Oct. 10, 1933.  M. OLLEY  1,930,282

SHOCK ABSORBER

Filed Feb. 1, 1932  2 Sheets-Sheet 1

Inventor
Maurice Olley
By Jameson, Hardman & Kehr
Attorneys

Oct. 10, 1933.        M. OLLEY        1,930,282

SHOCK ABSORBER

Filed Feb. 1, 1932        2 Sheets-Sheet 2

Inventor
Maurice Olley
By Spencer, Hardman and Nehl
Attorneys

Patented Oct. 10, 1933

1,930,282

UNITED STATES PATENT OFFICE 1,930,282

SHOCK ABSORBER

Maurice Olley, Detroit, Mich., assignor to Delco Products Corporation, Dayton, Ohio, a corporation of Delaware Application February 1, 1932. Serial No. 590,065

5 Claims. (Cl. 188—88)

This invention relates to improvements in hydraulic shock absorbers and particularly to control devices for such shock absorbers.

It is among the objects of the present invention to provide a control device for the hydraulic shock absorbers of a vehicle by which all of the shock absorbers on the vehicle may be adjusted concurrently in accordance with the nature of the road over which the vehicle is being operated.

A further object of the present invention is to provide each shock absorber with fluid flow control devices, all of which are adapted to be adjusted concurrently by a single operating member or actuator.

A still further object of the invention is to vary the tension of the springs yieldably urging the fluid flow control devices into normal operating position so they will be effective at different pressures.

Further objects and advantages of the present invention will be apparent from the following description, reference being had to the accompanying drawings wherein a preferred embodiment of one form of the present invention is clearly shown.

Figure 3:
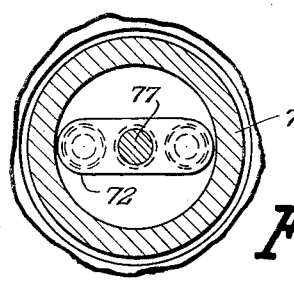
Fig. 3 is a detail sectional view taken along the line 3—3 of Fig. 2.
Figure 1:
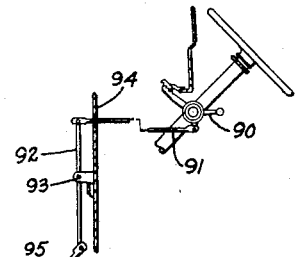
Fig. 1 is a diagrammatic view showing a fragmentary side view of the vehicle chassis with a shock absorber embodying the present invention applied thereto. The control mechanism is shown diagrammatically and attached to the steering column of the vehicle.
Figure 1:
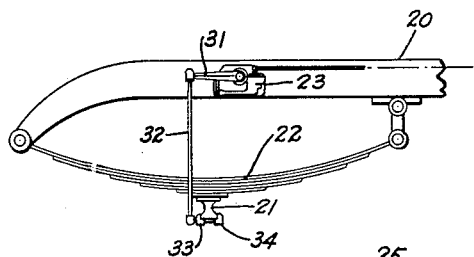

Referring to the drawings, the numeral 20 designates the frame of the vehicle which is supported upon the vehicle axle 21 by vehicle springs 22. The shock absorber designated as a whole by the numeral 23 is attached to the frame 20 in any suitable manner.

The shock absorber comprises a casing 25 providing a fluid reservoir 26 and a cylinder 27. Within the cylinder there is provided a reciprocable piston 28 which is adapted to be moved back and forth in said cylinder by the rocker arm 29 attached to the shaft 30 which is journalled in the shock absorber casing 25. One end of this shaft 30 extends outside of the shock absorber casing and has the shock absorber operating arm 31 attached thereto. The free end of this arm 31 is swivelly secured to a link 32, one end of this link being swivelly attached to a bracket 33 which is clamped to the axle 21 by clamping member 34. From this it may be seen that the piston 28 of the shock absorber is operatively connected with the axle 21 of the vehicle upon which axle the road wheels of the vehicle are mounted, said road wheels not being shown in the present drawings.

Figure 2:
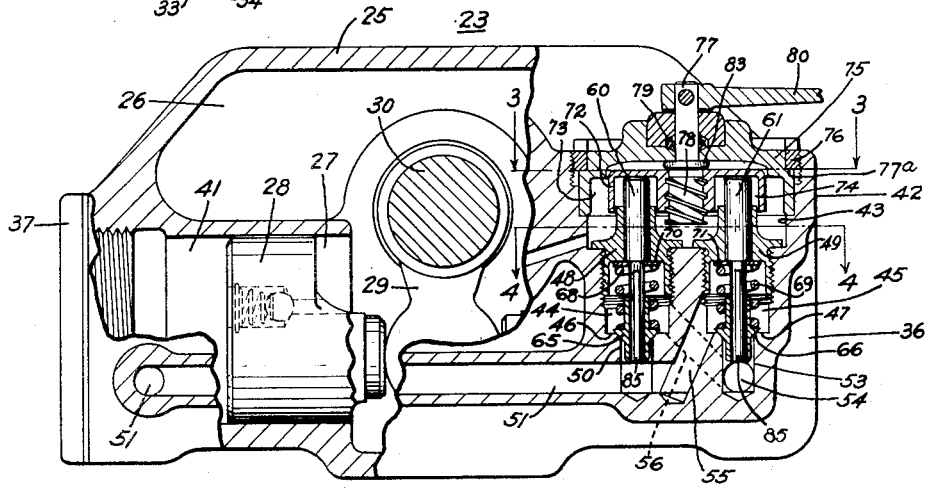
Fig. 2 is a front view of a shock absorber, portions thereof being broken away to show interior structures.
Figure 4:
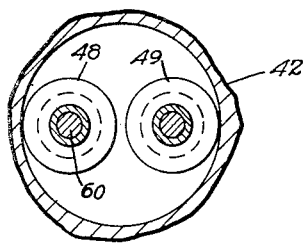
Fig. 4 is a detail sectional view taken along the line 4—4 of Fig. 2.
Figure 5:
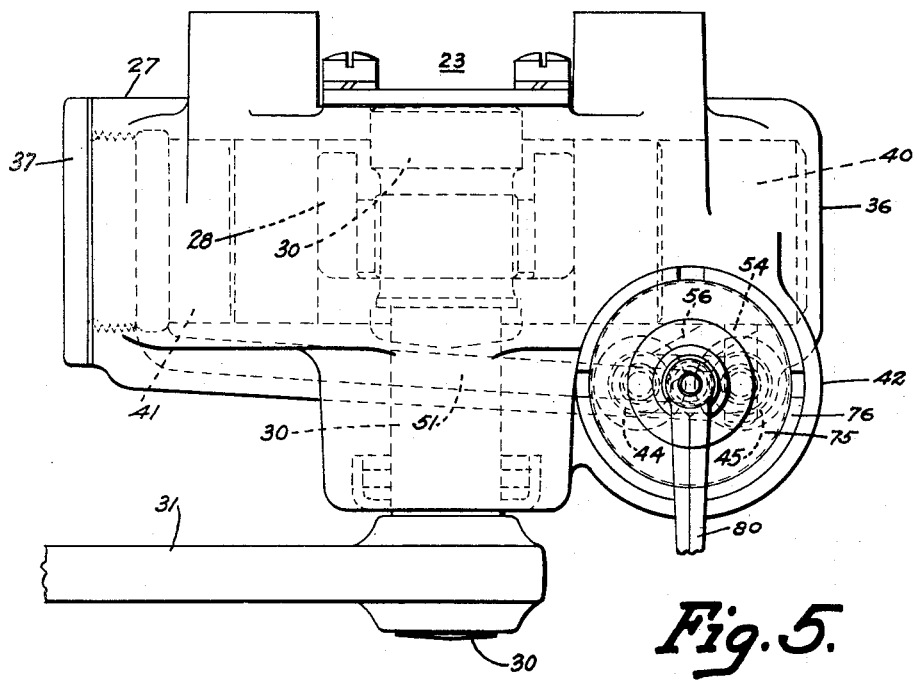
Fig. 5 is a top view of the shock absorber.
Figure 6:
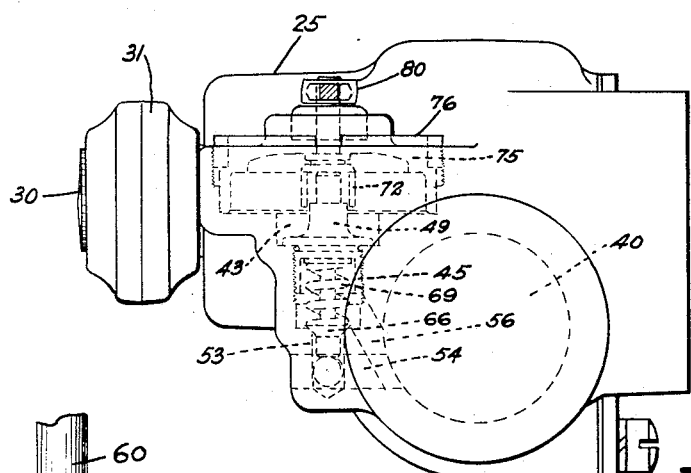
Fig. 6 is an end view of the shock absorber.

As shown in Fig. 2, one end of the cylinder is closed by the integral wall 36, the other by a cylinder head cap 37. Between the wall 36 of the casing and the adjacent end of the piston 28, spring rebound control chamber 40 is provided, while the spring compression control chamber 41 is formed between the opposite end of the piston 28 and the cylinder head cap 37.

At the end of the casing adjacent the wall 36 an extension 42 is provided having a recess 43 which may be termed the control chamber of the shock absorber. In the bottom of this recess 43 are two recesses 44 and 45 arranged side by side, these recesses providing valve chambers in which valve seats 46 and 47 respectively, are provided. The ends of the recesses 44 and 45, opening into the main control chamber 43, are interiorly threaded for receiving bearing collars 48 and 49 respectively, these bearing collars each having a central opening coaxial of the respective recesses 44 and 45 as shown in the Fig. 2. Valve chamber 44 is in communication with the spring compression control chamber 41 through duct 50 leading from the valve seat 46 into the channel 51, which channel opens into said spring compression control chamber 41. Valve chamber 45 is in communication with the spring rebound control chamber 40 via the duct 53 and the channel 54, duct 53 opening into the chamber 45 at the valve seat 47. The valve chamber 45 is also in communication with the channel 51 via the duct 55, however, this duct 55 communicates with chamber 45 on the relief side of the valve seat 47. Likewise the relief side of the valve chamber 44 is in communication with the channel 54 leading to the spring rebound control chamber 40 through the duct 56 as shown in Fig. 2. Bearing collar 48 slidably supports the valve pin 60; a similar valve pin 61 being slidably supported by the bearing collar 49. These valve pins each have a reduced portion extending through their respective valve chambers 44 and 45 into the respective ducts 50 and 53. The valve pin 60 slidably supports the pressure release valve 65 while valve pin 61 slidably supports the pressure release valve 66. Each pressure release valve 65 and 66 has an outwardly extending annular flange which is yieldably urged into engagement with its respective valve seat 46 or 47 by valve springs 68 and 69 respectively, whereby valves 65 and 66 normally, yieldably shut off communication between valve chambers 44 and 45 and their respective ducts 50 and 53. As shown in the Fig. 2, these springs are interposed between their respective valves 65 and 66 and abutment washers 70 and 71 secured to the respective valve pins 60 and 61. Valve pins 60 and 61 extend beyond the outer end of their respective bearing collars 48 and 49. An actuator 72 has two recesses 73 and 74, spaced so as to receive the extending ends of the valve pins 60 and 61, said recesses fitting over extensions on the respective bearing collars 48 and 49 whereby said actuator 72 is prevented from rotation. A cap 75 is inserted into the recess 43 and secured therein by the clamping ring 76 threaded into the outer end of the recess 43 and engaging shoulder 77ª on the cap 75. The cap rotatably supports the operating shaft 77 substantially coaxially of the recess 43. The other end of this shaft 77 has a threaded portion 78 which threadedly engages the actuator 72. A packing 79 is provided about the shaft 77 substantially to prevent leaks from the control chamber 43. To the portion of shaft 77 extending outside the shock absorber casing a lever 80 is attached, this lever being termed the shock absorber adjusting lever. It may be seen that rotation of shaft 77 by lever 80 will cause the threaded connection 78 with the actuator longitudinally of the axis of shaft 77 so that said actuator 72 may be moved toward or away from the valve pins 60 and 61 respectively. This action is due to the fact that the actuator 72 cannot rotate and shaft 77 having a shoulder 83 cannot move longitudinally of it axis but may only be rotated.

Figure 7:
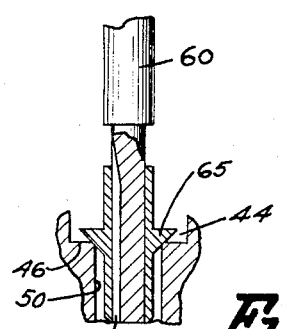
Fig. 7 is an enlarged detail view of a fluid flow control device of the shock absorber.

Each valve pin 60 and 61 has a longitudinal groove 85 in the portion which slidably supports the valves 65 and 66 respectively. As shown in Fig. 7, these grooves are of substantially constant depth for a portion of their length, said depth, however, decreasing as the grooves approach the respective bearing collars 48 and 49, thus movements of the valves 65 and 66 upwardly upon their respective pins 60 and 61 will gradually decrease the orifice provided by the tapering groove. Adjustment downwardly of the pins 60 and 61 by the actuator 72 will also reduce the area of the orifices initially.

In operation the shock absorber acts as follows:

The striking of an obstruction in the roadway by the road wheels of the vehicle urges the axle 21 toward the frame 20 thereby compressing vehicle springs 22. This movement of the axle 21 toward frame 20 will, through the connections including link 32, lever 31, shaft 30 and lever 29, move the piston 28 toward the left as regards Fig. 2, thereby exerting a pressure upon the fluid within the spring compression control chamber 41 and forcing it out of said chamber through the channel 51 into the valve chamber 45 on the exhaust side of the valve 66 therein, thereby assisting spring 69 in urging said valve against its seat. From chamber 45, a restricted flow is established through groove 85 in pin 61 into the channel 54. Fluid from the channel 51 will flow also through the longitudinal groove 85 in the valve pin 60 into the valve chamber 44 thence through the duct 56 into the communicating spring rebound control chamber 40. The flow of fluid through the longitudinal grooves 85 in pins 60 and 61, will be restricted in accordance with the adjustment of pins 60 and 61 by actuator 72 thus the piston movement toward the left will be resisted. To increase this initial restriction of the fluid, actuator 72 is operated to move pins 60 and 61 downwardly against the effects of their springs 68 and 69 which reduces the area of the orifice provided between groove 85 and the wall of valves 65 and 66. If the fluid pressure on the channel 51 is excessive, however, so that it cannot properly be relieved through the orifices of grooves 85, then the fluid pressure, being exerted against the valve 65, will move said valve from its seat 46 against the effect of spring 68, and thereby is established the flow of fluid through the duct 50 past the valve 65 into the valve chamber 44 from whence the fluid will flow into the valve rebound control chamber 40 via the duct 56 which opens into said chamber. This valve movement also increases the restriction of the orifice 85 in pin 60.

The return movement of the spring 22 to normal position, which movement is termed the rebounding movement, reverses the movement of the piston 28 so that, in response to such spring rebound movement, piston 28 will be moved toward the right as regards Fig. 2. Now pressure is exerted upon the fluid within the spring rebound control chamber 40, said fluid being forced from said chamber into the duct 56 and consequently against the relief or exhaust side of valve 65, tending to urge said valve closed. The fluid pressure will be directed also through channel 54 and duct 53 against valve 66, the initial fluid flow control being obtained by the grooves 85 in the valve pins 61 and 60 in a manner as has been described in connection with the associate valve 65. The fluid pressure, when sufficiently increased will move the valve against the effect of its spring 69 to establish a flow through duct 53 into the valve chamber 45, thence through duct 55 into the channel 51 which communicates with the spring compression control chamber 41.

The effectiveness of these fluid flow control devices including valves 65 and 66 and grooves 85 in pins 60 and 61 of said valves may be varied so that greater or less initial restriction to fluid flow or more or less pressure will be necessary to move the valves from their respective seats. The fluid flow adjusting mechanism comprises a hand lever 90 shown secured to the steering column of the vehicle in any suitable manner. This lever has the link rod 91 secured thereto, which link rod is also secured to one end of a lever 92 pivoted on a bracket as at 93. This bracket may be secured to partition 94 in the vehicle which separates the engine compartment from the passenger compartment. Lever 92 is also connected with a rod 95 connected with the shock absorber adjusting lever 80. From this it may be seen that when lever 90 is actuated. elements 91, 92 and 95 will be actuated to rotate the shock absorber adjusting arm or lever 80. When the arm 80 is operated to rotate shaft 77 in one direction, the actuator cup 72 will be moved toward the valve pins 60 and 61, urging them slidably through their bearing collars 48 and 49 respectively, toward their respective valves 65 and 66. Washers 70 and 71 on pins 60 and 61 respectively, will compress the respective springs 68 and 69, that is, will increase the tension of said springs so that they will urge their respective valves 65 and 66 upon the valve seats 46 and 47 respectively, with a greater pressure, and thus a greater fluid pressure will be necessary to move the valves from their seats. This action of the actuator by so moving the valve pins will also reduce the area of the orifice presented by grooves 85 thereby increasing the initial fluid flow restriction. When the lever 90 is moved in the opposite direction, however, lever 80 will rotate shaft 77 in the other direction, thus the screw threads 78 on shaft 77 will operate the actuator cup 72 in the direction away from pins 60 and 61 and thus these pins will reduce the tension of springs 68 and 69, thereby less pressure will be required to move the valves 65 and 66 from their seats.

The lever 92 is connected in any suitable manner with all of the levers 80 of all of the shock absorbers in the vehicle and consequently actuation of the adjusting lever 90, which is accessible from the driver's seat, will concurrently adjust all of the levers 80 of all of the shock absorbers on the vehicle, thus the operator of the vehicle may from his seat adjust all of the shock absorbers in accordance with the nature of the road over which the vehicle is being operated. If the roadbed is exceedingly rough, then lever 90 is operated to rotate all of the arms or levers 80 of the shock absorbers so that the actuators 72 thereof will move the valve pins 60 and 61 of the respective shock absorbers to decrease the initial orifice and also increase the tension of the springs in the fluid flow control devices and thus, by increasing the initial restriction to the fluid flow and also by requiring a greater pressure to operate the pressure release valves, the shock absorbers will offer a greater resistance to spring movements of the vehicle. On the contrary if the vehicle is being driven over a comparatively smooth highway or boulevard, then the lever 90 is actuated to rotate the arms 80 of all of the shock absorbers to decrease the restriction to fluid flow and the tension of the springs in the fluid flow control devices of said shock absorbers thereby providing for softer operation of the shock absorbers.

While the form of embodiment of the present invention as herein disclosed, constitutes a preferred form, it is to be understood that other forms might be adopted, all coming within the scope of the claims which follow.

What is claimed is as follows:

1. A shock absorber comprising a casing providing a cylinder; a piston in said cylinder forming a compression chamber at each end thereof; an automatic relief valve for each compression chamber; a spring in each valve yieldably urging it into closed position; a duct leading from the relief side of each valve to the pressure side of the other valve; a by-pass providing for a restricted flow of fluid around one of said valves; and a common member adapted to be operated concurrently to vary the tension of the springs of both relief valves.

2. A hydraulic shock absorber comprising, in combination, a casing providing a cylinder; a piston in said cylinder forming compression chambers therein; ducts in the casing connecting said compression chambers; spring loaded valves normally substantially closing said ducts, said valves each having means establishing a restricted communication between said chambers; and a manually operable actuator adapted to engage the valves to adjust them concurrently to vary the restricted communication established by said valves and the spring load upon said valves.

3. An hydraulic shock absorber comprising, in combination, a casing providing a cylinder in which a reciprocative piston forms two compression chambers; ducts connecting said chambers; a fluid flow controlling valve in each duct, each valve comprising a valve stem and a valve slidably supported upon said stem; a spring interposed between the stem and the valve supported thereon for urging the valve upon its seat in the duct; and a common member adapted to be actuated to move the stem of both valves simultaneously to adjust the tension of the valve springs.

4. An hydraulic shock absorber comprising, in combination, a casing providing a cylinder in which a reciprocative piston forms two compression chambers; ducts connecting said chambers; a fluid flow controlling valve in each duct, each valve comprising a valve stem and a valve slidably supported upon said stem, each stem having a longitudinal groove for establishing a restricted flow of fluid through the valve; a spring interposed between the stem and the valve thereon for urging the valve upon its seat in the duct; and a common member adapted to be actuated to move the stems of both valves simultaneously to vary the restriction to the flow of fluid through the respective valves and to adjust the tension of the valve springs.

5. An hydraulic shock absorber comprising, in combination, a casing providing a cylinder; a piston in said cylinder forming compression chambers therein; ducts in the casing connecting said compression chambers; spring loaded valves normally substantially closing said ducts, said valves each having means establishing a restricted communication between said chambers; a rotatable screw-threaded member; and an actuator on said screw-threaded member, engaging both valves, and adjusted, in response to rotation of the screw-threaded member to adjust said valves concurrently for varying the restricted communication of said valves and the spring load upon said valves.

MAURICE OLLEY.